United States Patent
Jhunjhunwala et al.

(10) Patent No.: US 11,228,958 B2
(45) Date of Patent: Jan. 18, 2022

(54) TECHNIQUES FOR TRANSMISSION OF RECOMMENDED BIT RATE QUERIES

(71) Applicant: QUALCOMM Incorporated, San Diego, CA (US)

(72) Inventors: Vashishth Jhunjhunwala, Hyderabad (IN); Tapas Ranjan Das, Hyderabad (IN); Ravi Kanth Kotreka, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/930,743

(22) Filed: May 13, 2020

(65) Prior Publication Data

US 2021/0329523 A1 Oct. 21, 2021

(51) Int. Cl.
*H04W 36/00* (2009.01)
*H04W 36/30* (2009.01)
*H04W 36/08* (2009.01)
*H04L 1/00* (2006.01)
*H04W 36/14* (2009.01)

(52) U.S. Cl.
CPC .......... *H04W 36/30* (2013.01); *H04L 1/0009* (2013.01); *H04L 1/0026* (2013.01); *H04W 36/0022* (2013.01); *H04W 36/0055* (2013.01); *H04W 36/08* (2013.01); *H04W 36/14* (2013.01)

(58) Field of Classification Search
CPC ..... H04W 36/30; H04W 40/12; H04W 40/16; H04W 72/12; H04W 72/1226; H04W 72/08; H04W 28/0268; H04L 47/27
See application file for complete search history.

(56) References Cited

U.S. PATENT DOCUMENTS

| | | | |
|---|---|---|---|
| 7,315,814 B2 * | 1/2008 | Vainio | G10L 19/18 704/221 |
| 2001/0017882 A1 * | 8/2001 | Umeda | H04W 52/267 375/130 |
| 2011/0122786 A1 * | 5/2011 | Koo | H04L 1/0014 370/252 |
| 2017/0019631 A1 * | 1/2017 | Jansson | H04L 47/2416 |
| 2019/0394700 A1 * | 12/2019 | Lekutai | H04W 40/14 |

\* cited by examiner

*Primary Examiner* — Shantell L Heiber
(74) *Attorney, Agent, or Firm* — Patterson & Sheridan, LLP

(57) ABSTRACT

Certain aspects of the present disclosure provide techniques transmitting a recommended bit rate query. A method that may be performed by a user equipment (UE) generally includes participating in a voice call with a base station using a channel and a bit rate for the voice call, measuring one or more channel quality metrics for the channel during the voice call, determining whether to transmit a query message to the base station to request a change in the bit rate based, at least in part, on the measured one or more channel quality metrics, at least one of a handover indication received from the base station or a change mode request received from the base station, and a prohibit timer, and taking one or more actions based on the determination.

16 Claims, 8 Drawing Sheets

TECHNIQUES FOR TRANSMISSION OF RECOMMENDED BIT RATE QUERIES

CROSS REFERENCE TO RELATED APPLICATIONS

The present application claims the benefit of Indian Patent Application Serial Number 202041016210, filed Apr. 15, 2020, which is assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for transmitting recommended bit rate queries in a network.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved multi-universal subscriber identification module (USIM) and dual connectivity operation.

Certain aspects provide a method, performed by a user equipment (UE), for wireless communication. The method generally includes participating in a voice call with a base station using a channel and a bit rate for the voice call, measuring one or more channel quality metrics for the channel during the voice call, determining whether to transmit a query message to the base station to request a change in the bit rate based, at least in part, on the measured one or more channel quality metrics, at least one of a handover indication received from the base station or a change mode request received from the base station, and a prohibit timer, and taking one or more actions based on the determination.

Certain aspects provide an apparatus for wireless communications by a user equipment. The apparatus generally includes at least one processor configured to participate in a voice call with a base station using a channel and a bit rate for the voice call, measure one or more channel quality metrics for the channel during the voice call, determining whether to transmit a query message to the base station to request a change in the bit rate based, at least in part, on the measured one or more channel quality metrics, at least one of a handover indication received from the base station or a change mode request received from the base station, and a prohibit timer, and take one or more actions based on the determination. The apparatus also generally includes a memory coupled with the at least one processor.

Certain aspects provide an apparatus for wireless communications by a user equipment in a network. The apparatus generally includes means for participating in a voice call with a base station using a channel and a bit rate for the voice call, means for measuring one or more channel quality metrics for the channel during the voice call, means for determining whether to transmit a query message to the base station to request a change in the bit rate based, at least in part, on the measured one or more channel quality metrics, at least one of a handover indication received from the base station or a change mode request received from the base station, and a prohibit timer, and means for taking one or more actions based on the determination.

Certain aspects provide a non-transitory computer-readable medium for wireless communications by a user equipment in a network. The non-transitory computer-readable medium generally includes instructions that, when executed by at least one processor, cause the at least one processor to participate in a voice call with a base station using a channel and a bit rate for the voice call, measure one or more channel quality metrics for the channel during the voice call, determining whether to transmit a query message to the base station to request a change in the bit rate based, at least in part, on the measured one or more channel quality metrics, at least one of a handover indication received from the base station or a change mode request received from the base station, and a prohibit timer, and take one or more actions based on the determination.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for determining when to transmit a recommended bit rate query to request a change in the bit rate of a voice call. In certain cases, the determination of whether to transmit the recommended bit rate query may be based on one or more channel quality measurements of a channel used for the voice call. Additionally, in some cases, the determination of whether to transmit the recommended bit rate query may be based further on at least one of a handover indication or a change mode request. Additionally, in some cases, the determination of whether to transmit the recommended bit rate query may be based further on a prohibit timer.

As noted, the following description provides examples of techniques for determining when to transmit a recommended bit rate, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
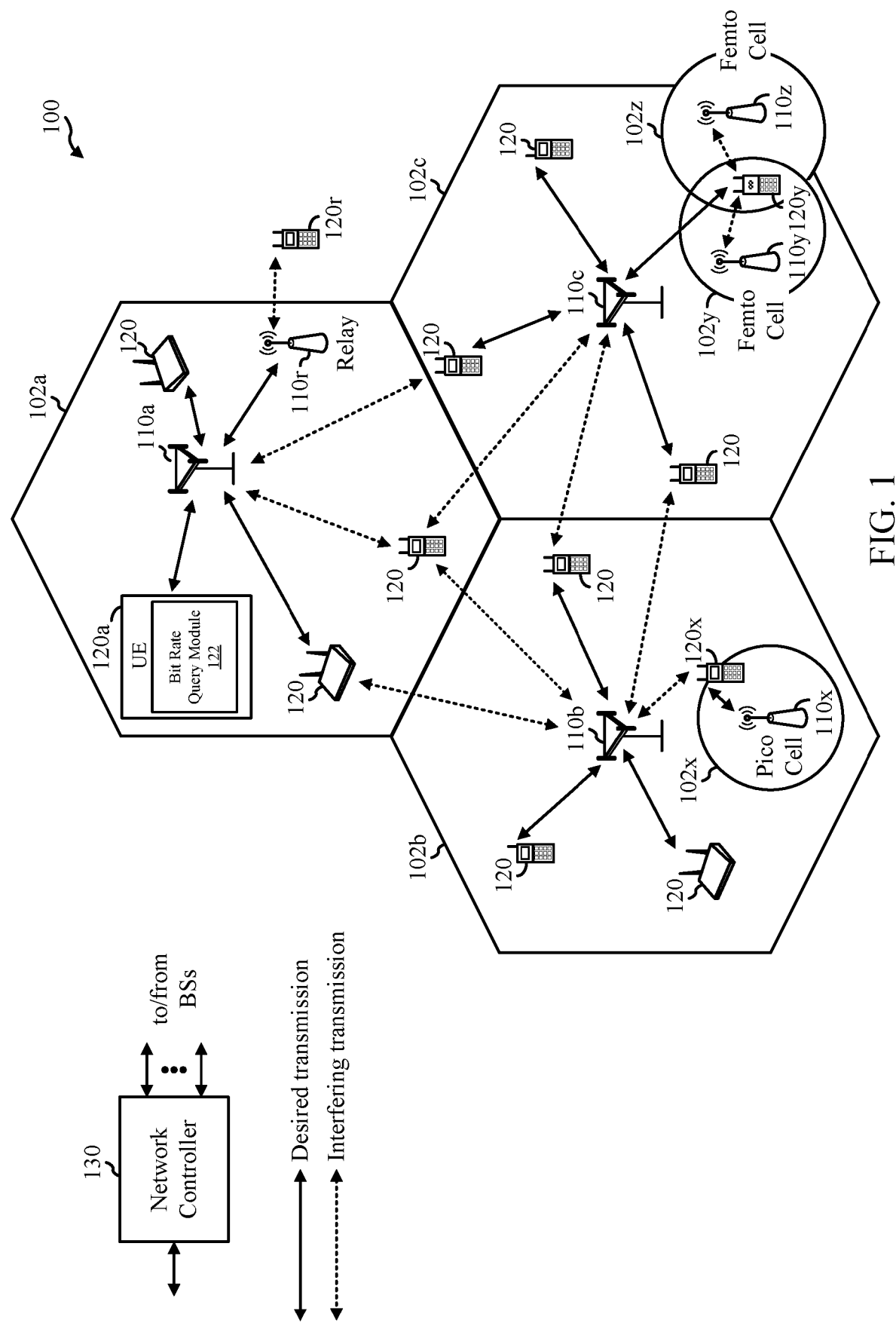
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110*a-z* (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110*a*, 110*b* and 110*c* may be macro BSs for the macro cells 102*a*, 102*b* and 102*c*, respectively. The BS 110*x* may be a pico BS for a pico cell 102*x*. The BSs 110*y* and 110*z* may be femto BSs for the femto cells 102*y* and 102*z*, respectively. A BS may support one or multiple cells. The BSs 110 communicate with user equipment (UEs) 120*a-y* (each also individually referred to herein as UE 120 or collectively as UEs 120) in the wireless communication network 100. The UEs 120 (e.g., 120*x*, 120*y*, etc.) may be dispersed throughout the wireless communication network 100, and each UE 120 may be stationary or mobile.

According to certain aspects, the UEs 120 may be configured for transmitting a recommended bit rate query, as described herein. As shown in FIG. 1, the UE 120*a* includes a bit rate query module 122. The bit rate query module 122 may be configured to perform the operations illustrated in one or more of FIGS. 3 and 5-8, as well as other operations disclosed herein for determining when to transmit a recommended bit rate query, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
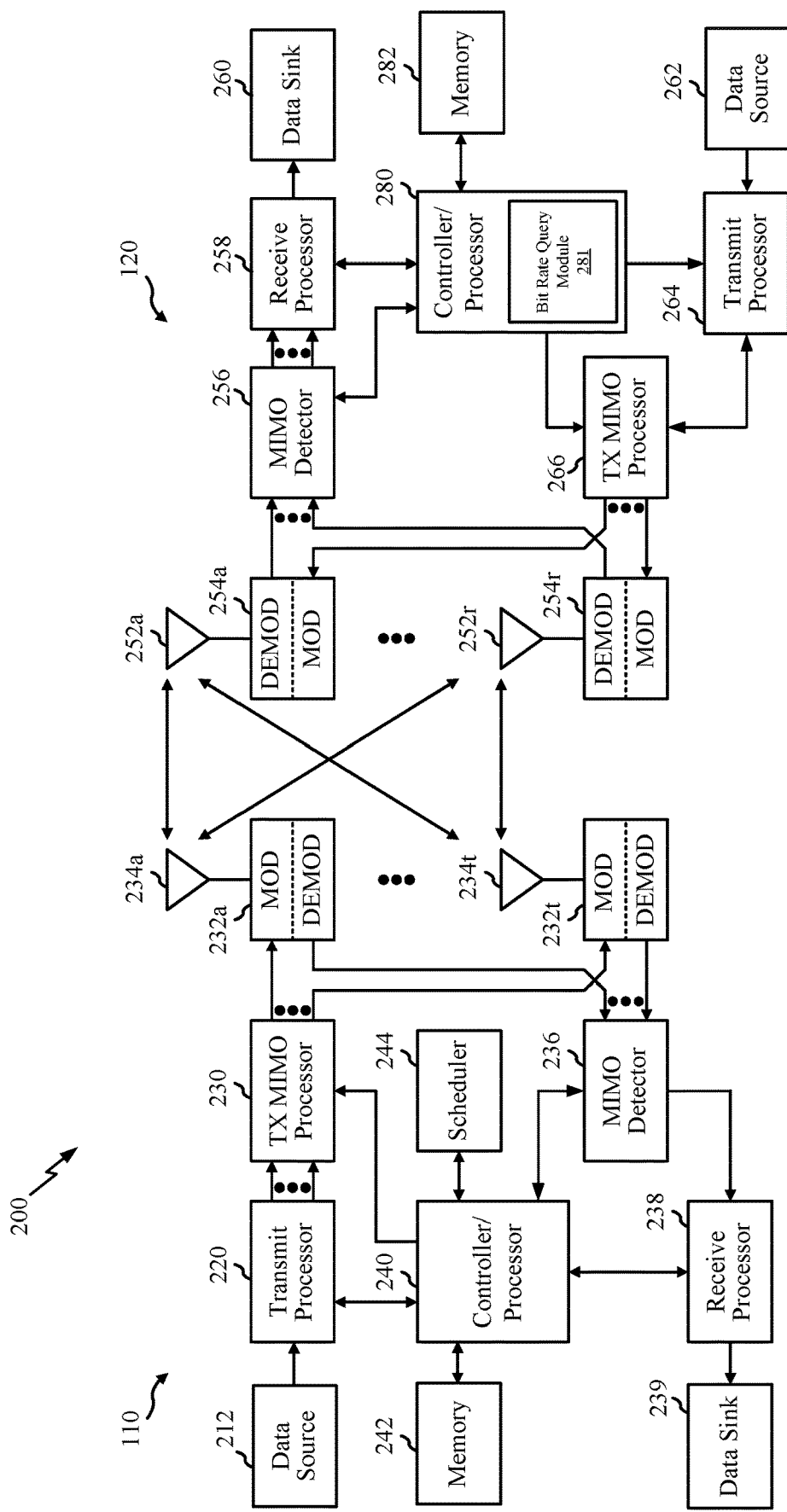
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in the transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in the transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the BS 110 and/or UE 120a may perform or direct the execution of processes for the techniques described herein. For example, as shown in FIG. 2, the controller/processor 280 of the UE 120a includes a bit rate query module 281 that may be configured to perform the operations illustrated in one or more of FIGS. 3 and 5-8, as well as other operations disclosed herein for determining when to transmit a recommended bit rate query, according to aspects described herein. Although shown at the Controller/Processor, other components of the UE 120a and BS 110a may be used performing the operations described herein.

Example Recommended Bit Rate Query Transmission Techniques

During a multimedia telephony (MMTel) call that includes voice and/or video by a user equipment (UE) in a long term evolution (LTE) system, a Radio Access Network (RAN) procedure may be performed to recommend a bit rate to be used by the UE for both uplink and downlink transmissions, which is intended to improve call quality under varying wireless channel conditions. A similar procedure may also be applied in a 5G NR system and the UE may indicate the capability to support such procedure to the network.

Figures 3, 4:
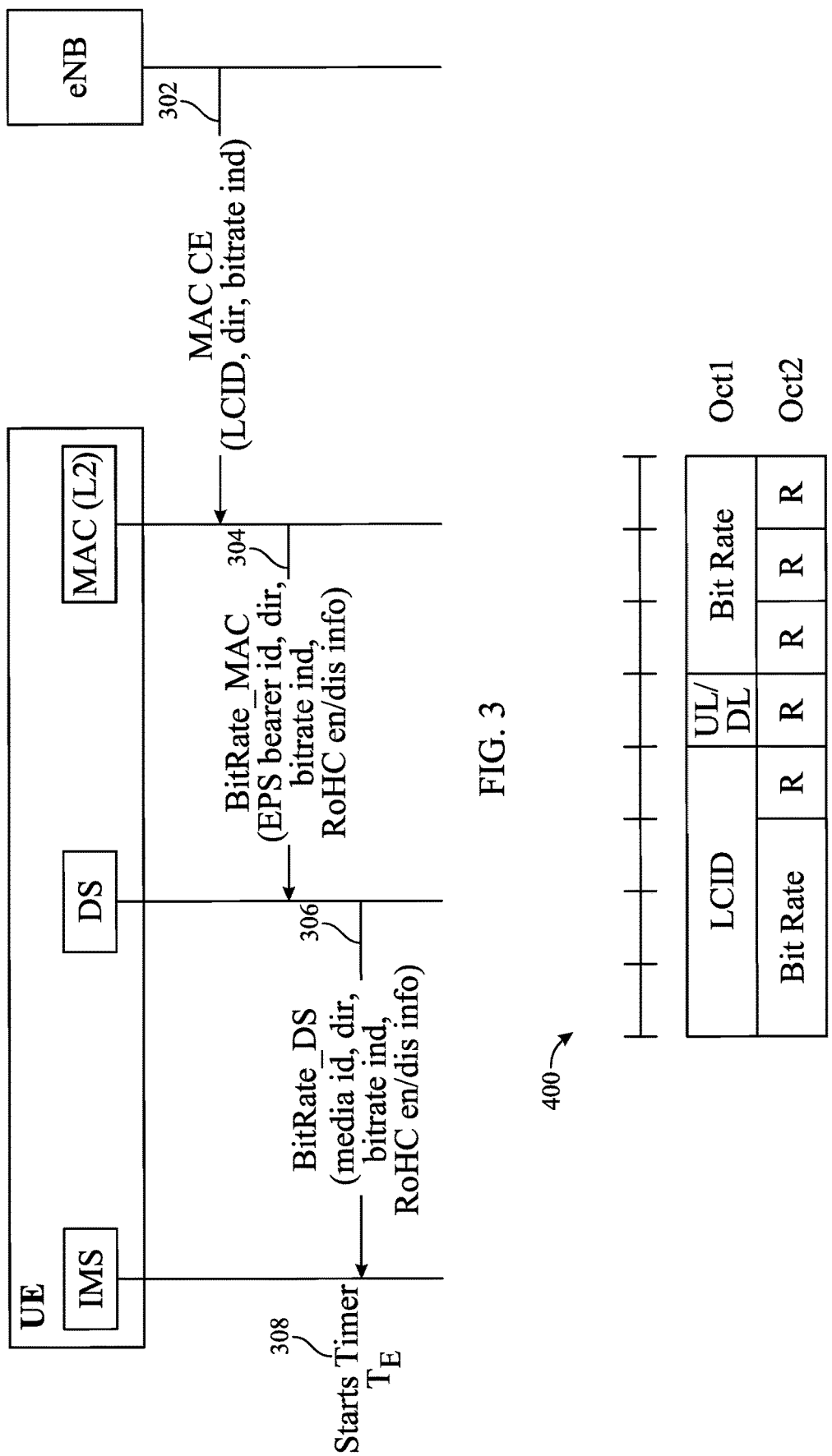
FIG. 3 is a call flow diagram illustrating an example recommended bit rate procedure.
FIG. 4 illustrates an example media access control control element (MAC-CE) for transmission of a recommended bit rate.

For example, as illustrated in FIG. 3, during this recommended bit rate procedure, an eNB/gNB may detect a radio link condition and determine a recommended bit rate for the UE. The eNB/gNB may then transmit an indication of the recommended bit rate with a specific direction (e.g., uplink or downlink) to a UE that has indicated support for a bit rate recommendation message.

As illustrated in FIG. 4, the indication of the recommended bit rate may be transmitted in a media access control (MAC) control element (CE) 400. For example, as illustrated, the MAC CE 400 may include a logical channel ID (LCID) field, an uplink (UL)/downlink (DL) direction indication field, one or more bit rate indication fields, and a plurality of reserved (R) fields. According to aspects, the LCID field may include information indicating a type of MAC CE. For example, in some cases, a value of 10110 in the LCID field may indicate that the MAC CE is a recommended bit rate MAC CE transmitted from the eNB/gNB to the UE. In other cases, a value of 10100 in the LCID field may indicate that the MAC CE is a recommended bit rate query MAC CE transmitted from the UE to the eNB/gNB. Further, the UL/DL direction indication may provide an indication of the direction (e.g., either uplink or downlink) to which the recommended bit rate applies. Additionally, the one or more bit rate fields may carry information indicated the recommended bit rate.

Returning to FIG. 3, as illustrated, the UE may receive at 302 the MAC CE, including the recommended bit rate, at a MAC layer of the UE. The MAC layer of the UE may then pass a BitRate_MAC message to a DS layer at 304, including an evolved packet system (EPS) bearer ID, an indication of the UL/DL direction, an indication of the recommended bit rate, and robust header compression (RoHC) enabled/disabled information. Further, as shown, the DL layer may then pass a BitRate_DS message to an internet protocol multimedia core network subsystem (IMS) layer of the UE at 306, including a media ID, the indication of the UL/DL direction, the indication of the recommended bit rate, and the RoHC enabled/disabled information. Thereafter, the UE may start a timer $T_E$ at 308 after expiration of which the UE may begin communicating according to the recommended bit rate.

Figure 5:
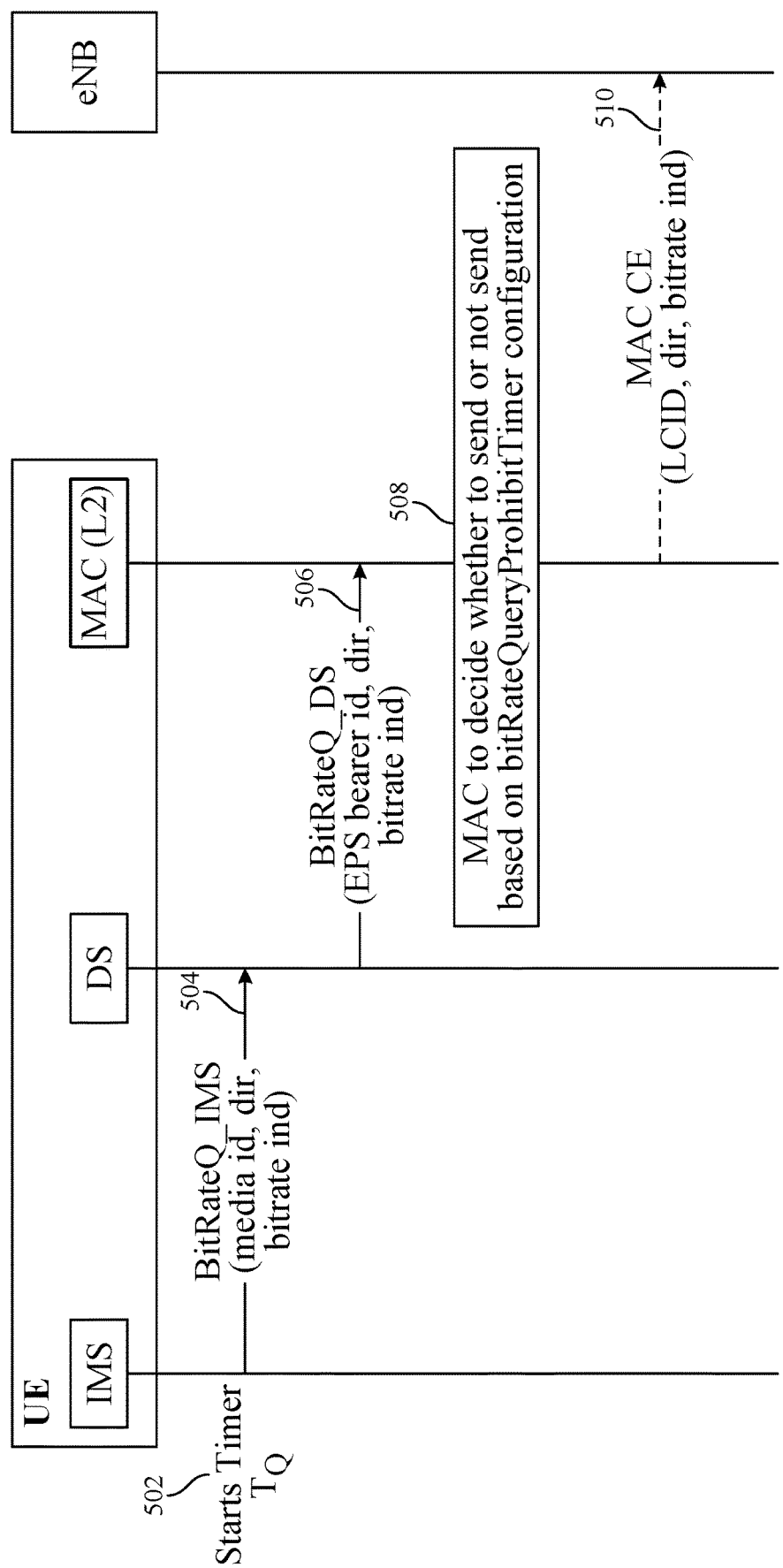
FIG. 5 is a call flow diagram illustrating an example recommended bit rate query procedure.

Additionally, as shown in FIG. 5, in some cases, the UE may attempt to increase/refine the bit rate (e.g., for uplink or downlink) beyond a previously received recommended bit rate by transmitting a recommended bit rate query to the eNB/gNB. In certain cases, a prohibit timer ($T_Q$) may be configured per logical channel by the eNB/gNB to limit UEs sending frequent queries. Accordingly, in such cases, only after expiration of the prohibit timer may UE may transmit the recommended bit rate query to the eNB/gNB to adjust a bit rate for the call.

For example, as illustrated, when the UE wants to increase/refine the bit rate beyond a previously received recommended bit rate, an IMS layer of the UE may start the prohibit timer at 502. The IMS layer may then pass a bit rate query message (e.g., BitRateQ_IMS message) to a DS layer of the UE at 504, including a media ID, an indication of the UL/DL direction, and an indication of the recommended bit rate. Thereafter, as illustrated, the DS layer may pass a BitRateQ_DS message to a MAC layer of the UE at 506, indicating an EPS bearer ID, the indication of the UL/DL direction, and the indication of the recommended bit rate. Further, as illustrated, the MAC layer may then determine at 508 whether the prohibit timer has expired. If the prohibit timer has not expired, the MAC layer may delay sending the recommended bit rate query to the eNB/gNB. However, if the prohibit timer has expired, the MAC layer may then proceed with recommended bit rate query to the eNB/gNB. The recommended bit rate query may be transmitted in a MAC CE, including an LCID indicating that the MAC CE is a recommended bit rate query, the indication of the UL/DL direction, and the indication of the recommended bit rate.

Thereafter, the eNB/gNB may receive the recommended bit rate query and determine whether the channel can support the recommended bit rate in the query from the UE. The eNB/gNB may then transmit an updated recommended bit rate to the UE based on the recommended bit rate query received from the UE.

In some cases, the eNB/gNB transmit the recommended bit rate via MAC CE message that includes an index value that maps to the corresponding recommended bit rate. According to aspects, the recommended bit rate may be defined as a physical layer bit rate including the actual media (e.g., audio/video) traffic payload, including real-time transport protocol/user datagram protocol/internet protocol and modem higher-layer (e.g., Packet Data Convergence Protocol (PDCP)/Radio Link Control (RLC)/MAC) overheads, in kilobit per second.

According to aspects, when the UE receives RAN messages that include recommended bit rate info (e.g., recommended bit rate and direction) from the eNB/gNB, the UE saves the recommended bit rate info as "RAN context" information and uses this information for communicating with the eNB/gNB in a connected mode of operation. For example, a commonly used default audio codec in a VoLTENoNR voice call scenario may use a certain selected mode and bit rate (e.g., AMR-WB 23.85 kbit/s, EVS 24.4 kbit/s, etc.). When the UE receives the recommended bit rate information from the eNB/gNB, the UE may then adapt its audio codec mode bit rate according to the "RAN context" information to improve the voice call quality. A similar process may be applied to video streams/calls as well.

In general, this recommended bit rate procedure allows the eNB/gNB to configure a UE with a higher allowed bit rate when detected radio link condition are good in a specific direction and configure the UE with a lower allowed bit rate when detected radio link condition in a specific direction are not good.

However, while certain standards indicate that the UE may take into account a prohibit timer when deciding whether to transmit a recommended bit rate query, these standards do not define the recommended bit rate query procedure itself (e.g., determining when the UE may decide to generate and transmit a recommended bit rate query). This timer based query may be not based on actual network condition and may also not consider a cell change or far-end device bitrate recommendation in a change mode request (CMR) bit in real-time transport protocol (RTP). In some cases, the UE may make a better decision regarding whether to transmit a recommended bit rate query based on a received or calculated channel condition like block error rate (BLER), signal-to-interference-plus-noise ratio (SINR), and the like.

Accordingly, aspects of the present disclosure provide techniques for determining when to transmit a recommended bit rate query, taking into account one or more channel quality metrics as well as any received handover indications and change mode requests. In some cases, these techniques may apply to both uplink and downlink directions.

Figure 6:
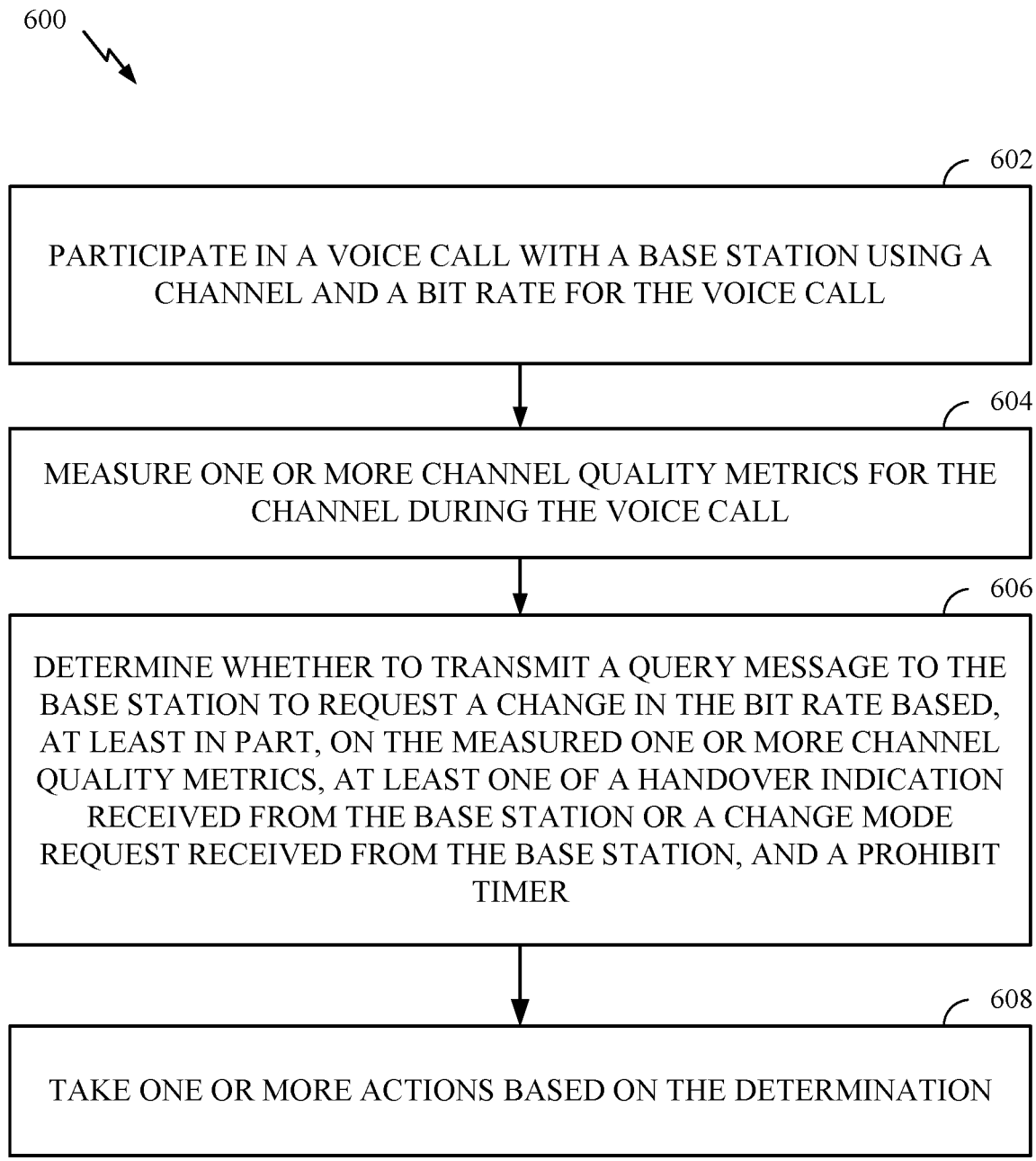
FIG. 6 is a flow diagram illustrating example operations for wireless communication by a user equipment (UE), in accordance with certain aspects of the present disclosure.

FIG. 6 is a flow diagram illustrating example operations 600 for wireless communication, in accordance with certain aspects of the present disclosure. The operations 600 may be performed, for example, by a UE (e.g., such as a UE 120 in the wireless communication network 100). Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

Operations 600 begin at 602, by participating in a voice call with a base station using a channel and a bit rate for the voice call. In some cases, the voice call may include, for example, a voice over long term evolution (VoLTE) call. In other cases, the voice call include a voice over new radio (VoNR) call. Additionally, in some cases, participating in the voice call may further include establishing the voice call with the base station.

At 604, the UE measures one or more channel quality metrics for the channel during the voice call.

At 606, the UE determines whether to transmit a query message to the base station to request a change in the bit rate based, at least in part, on the measured one or more channel quality metrics, at least one of a handover indication received from the base station or a change mode request received from the base station, and a prohibit timer.

At 608, the UE takes one or more actions based on the determination.

As noted above, the UE may establish and participate in a voice call with the base station, such as a VoLTE call or other media call. The UE may be configured with a particular bit rate (or codec rate) for communication during the voice call. In certain cases, channel conditions may improve or degrade during the voice call, making the configured bit rate not ideal for the voice call. Thus, in such cases, the UE may determine whether to transmit a recommended bit rate query to the base station, requesting a change in the bit rate for the voice call. In certain cases, determining whether to transmit the recommended bit rate query to the base station may be based, at least in part, on one or more measured channel quality metrics for the channel during the voice call. In certain cases, deciding whether to transmit the recommended bit rate query may depend on whether the channel quality metrics have improved or degraded relative to one or more previous channel quality metrics.

Figure 7:
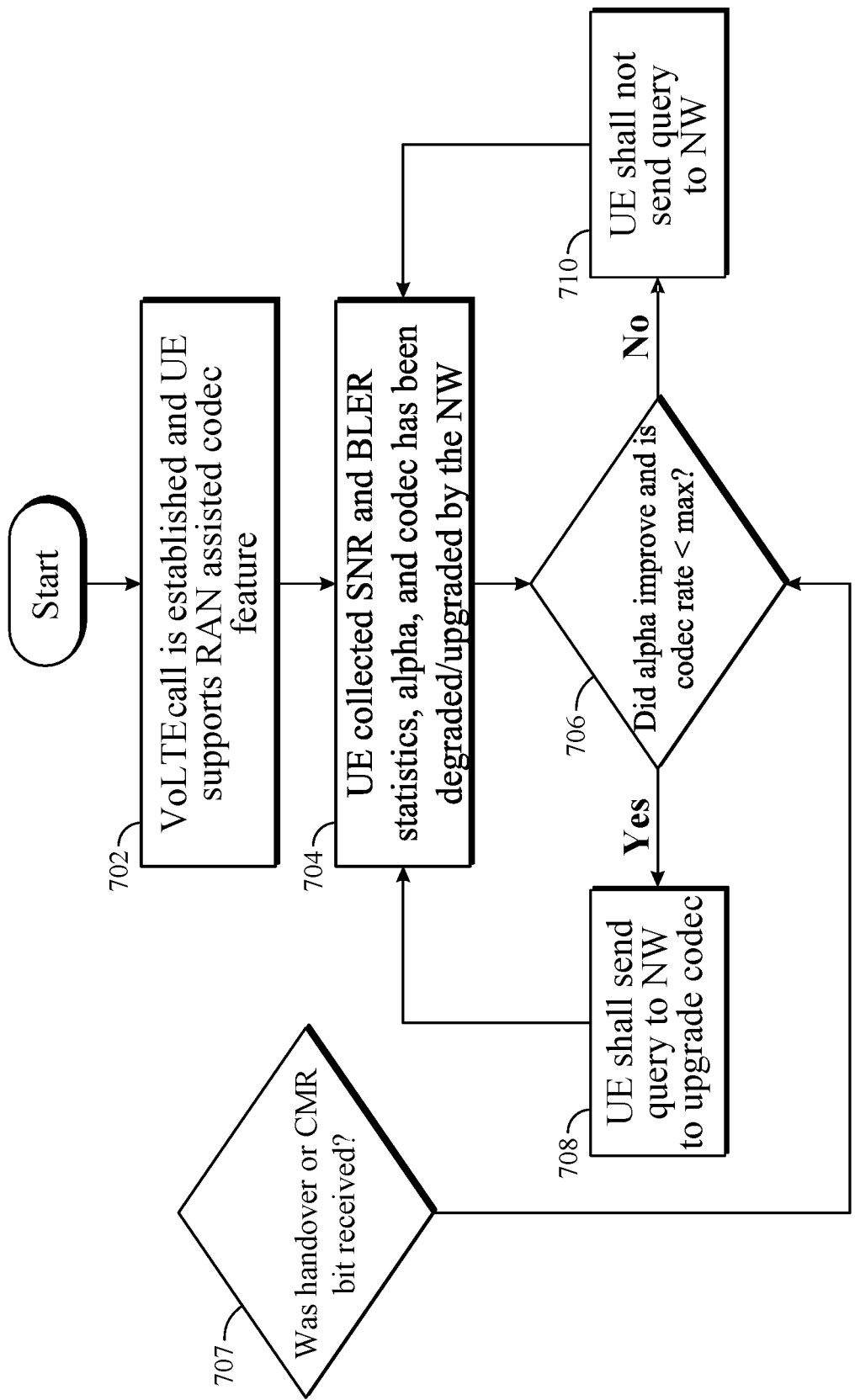
FIG. 7 illustrates an example decision flow diagram of operations for determining whether to transmit recommended bit rate query to the network, in accordance with certain aspects of the present disclosure.

FIG. 7 illustrates an example decision flow diagram of operations for determining whether to transmit recommended bit rate query to the base station, in accordance with certain aspects of the present disclosure. As illustrated, the operations illustrated in FIG. 7 may correspond to the case when channel quality metrics improve relative to one or more previous channel quality metrics.

For example, as illustrated at 702, the UE may establish and participate in a voice call, such as a VoLTE call. According to aspects, the UE may support a radio access network (RAN) assisted codec adaptation feature, allowing the UE and base station to adjust code rates/bit rates during the VoLTE call. According to aspects, the UE may participate in the voice call using a particular bit rate configured by the base station, for example, as illustrated in FIG. 3.

At 704, the UE may measure one or more channel quality metrics for the channel during the voice call, corresponding to a parameter, such as alpha. In certain cases, the one or more channel quality metrics may include a block error rate (BLER), signal to noise ratio (SNR), reference signal received quality (RSRQ), and the like corresponding to a channel used for the voice call.

At 706, the UE may detect whether the measured one or more channel quality metrics (e.g., alpha) have improved relative to one or more previous channel quality metrics and that the bit rate is less than a maximum bit rate for the voice call.

For example, in some cases, at 706, the UE may detect that the measured one or more channel quality metrics (e.g., alpha) have improved relative to one or more previous channel quality metrics, for example, by a threshold amount. Additionally, at 706, the UE may detect that the bit rate of the voice call is less than a maximum bit rate for the voice call.

Accordingly, in this case, as illustrated at 706, the UE may determine to transmit the query message to the base station based, at least in part, on the detecting that the measured one or more channel quality metrics have improved by the threshold amount and based on the detection that the bit rate is less than the maximum bit rate for the voice call.

Thereafter, as illustrated at 708, the UE may take action to transmit the recommended bit rate query to the base station based, for example, on the determination to transmit the recommended bit rate query. In certain cases, the recommended bit rate query may include a request to increase the bit rate for the voice call based on the detection that measured one or more channel quality metrics have improved. Further, in some cases, the recommended bit rate query may be transmitted to the base station in a MAC CE, as described above with respect to FIG. 5.

In some cases, determining whether to transmit the query message to the base station to request a change in the bit rate may be further based on a prohibit timer, indicating a time after expiration of which the query message may be transmitted. Accordingly, in some cases, taking action to transmit the recommended bit rate query to the base station at 708 may include waiting to transmit the recommended bit rate query to the base station until after expiration of the prohibit timer.

In other cases, at 706, the UE may detect that the one or more channel quality metrics have not improved by the threshold or that the bit rate of the voice call is not below the maximum bit rate for the voice call. Accordingly, in this case, determining whether to transmit the query message to the base station may comprise the UE determining to not transmit the query message to the base station based, at least in part, on the detecting that the measured one or more channel quality metrics have not improved and/or that the bit rate is not less than the maximum bit rate for the voice call.

Accordingly, as shown at 710, the UE may take action to not transmit the recommended bit rate query (e.g., by dropping the transmission). For example, in some cases, taking action to not transit the recommended bit rate query may comprise deciding not to generate the recommended bit rate query. In some cases, the UE may take action to not transmit the recommended bit rate query if the prohibit timer has not expired.

In some cases, the determination of whether to transmit the recommended bit rate query to the base station at 706 may also be based on at least one of a handover indication received from the base station or a change mode request received from the base station, as illustrated by 707.

For example, in some cases, when the UE receives a handover indication from the base station, the UE may decide to delay transmission of the recommended bit rate query to the base station until after the UE performs the handover and determines whether the one or more channel quality metrics have improved or not. In some cases, the UE may receive a handover indication to handover from a first cell to a second cell. In such cases, the UE may delay transmission of the recommended bit rate query until after the UE hands over from the first cell to the second cell. Further, the UE may also delay transmission of the recommended bit rate query until after determining whether the one or more channel conditions in the second cell have improved or not by a threshold amount. Accordingly, if the one or more channel conditions have improved by a threshold amount in the second cell, the UE may decide to transmit the recommended bit rate query to request a change (e.g., an increase) in the bit rate for the voice call. However, if the UE detects that the one or more channel quality metrics in the second cell have not improved by the threshold amount, the UE may decide to not transmit the recommended bit rate query. Similarly, if the UE receives a change mode request from the base station, the UE may wait until after changing modes to decide whether to transmit the recommended bit rate query to the base station.

Figure 8:
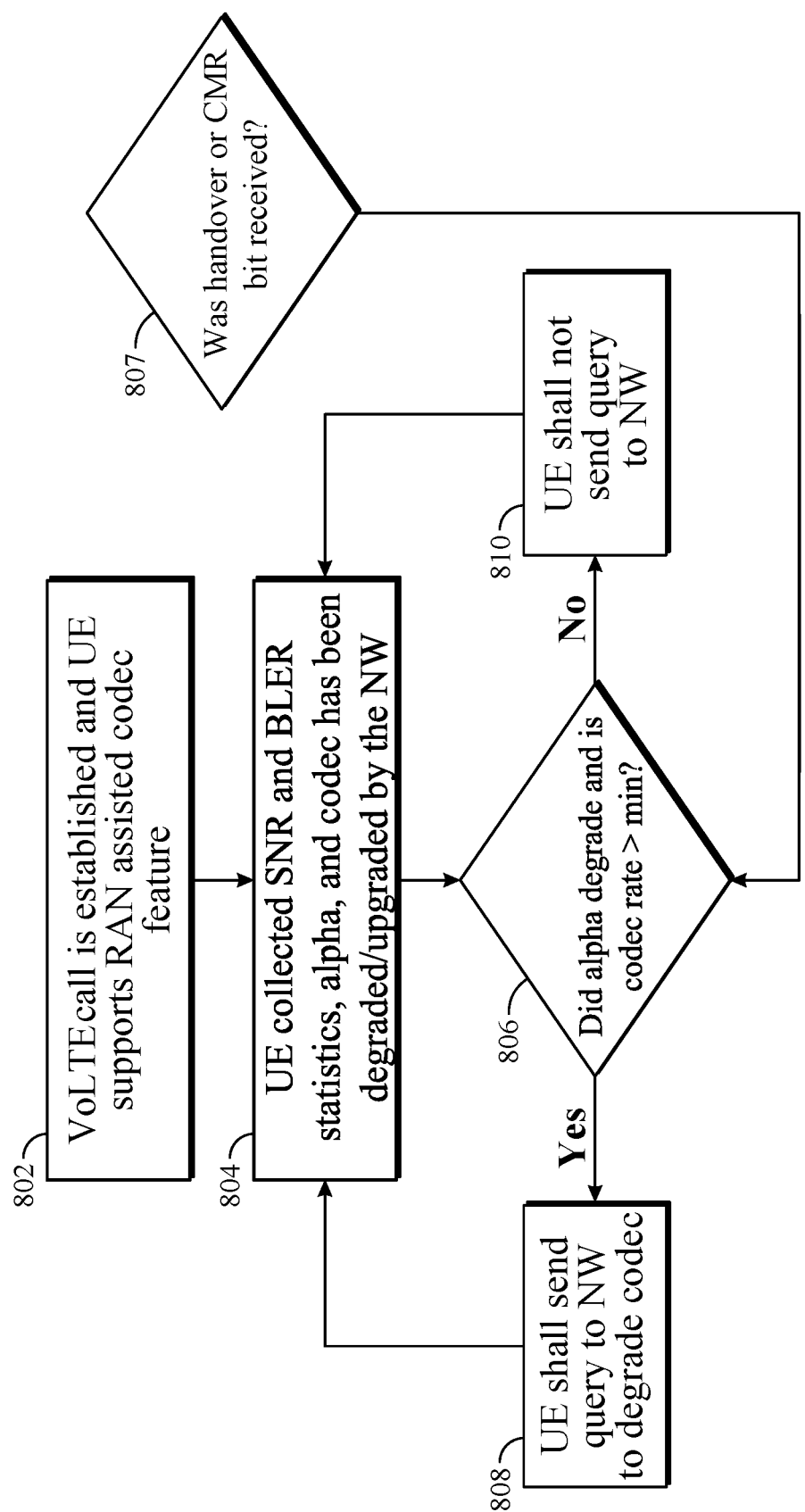
FIG. 8 illustrates an example decision flow diagram of operations for determining whether to transmit recommended bit rate query to the network, in accordance with certain aspects of the present disclosure.

FIG. 8 illustrates an example decision flow diagram of operations for determining whether to transmit recommended bit rate query to the base station, in accordance with certain aspects of the present disclosure. As illustrated, the operations illustrated in FIG. 8 may correspond to the case when channel quality metrics degrade relative to one or more previous channel quality metrics.

For example, as illustrated at 802, the UE may establish and participate in a voice call, such as a VoLTE call. As noted above, the UE may support a RAN-assisted codec adaptation feature, allowing the UE and base station to adjust code rates/bit rates during the VoLTE call. According to aspects, the UE may participate in the voice call using a particular bit rate configured by the base station, for example, as illustrated in FIG. 3.

At 804, the UE may measure one or more channel quality metrics for the channel during the voice call, corresponding to the parameter alpha. As noted, the one or more channel quality metrics may include a block error rate (BLER), signal to noise ratio (SNR), reference signal received quality (RSRQ), and the like corresponding to a channel used for the voice call.

At 806, the UE may detect whether the measured one or more channel quality metrics (e.g., alpha) have degraded relative to one or more previous channel quality metrics and that the bit rate is greater than a minimum bit rate for the voice call.

For example, in some cases, at 806, the UE may detect that the measured one or more channel quality metrics (e.g., alpha) have degraded relative to one or more previous channel quality metrics, for example, by a threshold amount. Additionally, at 806, the UE may detect that the bit rate of the voice call is greater than a minimum bit rate for the voice call.

Accordingly, in this case, as illustrated at 806, the UE may determine to transmit the query message to the base station based, at least in part, on the detecting that the measured one or more channel quality metrics have degraded by the threshold amount and based on the detection that the bit rate is greater than the minimum bit rate for the voice call.

Thereafter, as illustrated at 808, the UE may take action to transmit the recommended bit rate query to the base station based, for example, on the determination to transmit the recommended bit rate query. In certain cases, the recommended bit rate query may include a request to decrease the bit rate for the voice call based on the detection that measured one or more channel quality metrics have degraded. Further, in as noted above, the recommended bit rate query may be transmitted to the base station in a MAC CE, as described above with respect to FIG. 5.

In some cases, as noted above, determining whether to transmit the query message to the base station to request a change in the bit rate may be further based on a prohibit timer, indicating a time after expiration of which the query message may be transmitted. Accordingly, in some cases, taking action to transmit the recommended bit rate query to the base station at 808 may include waiting to transmit the recommended bit rate query to the base station until after expiration of the prohibit timer.

In other cases, at 806, the UE may detect that the one or more channel quality metrics have not degraded by the threshold or that the bit rate of the voice call is not greater than the minimum bit rate for the voice call. Accordingly, in this case, determining whether to transmit the query message to the base station may comprise the UE determining to not transmit the query message to the base station based, at least in part, on the detecting that the measured one or more channel quality metrics have not degraded and/or that the bit rate is not greater than the minimum bit rate for the voice call.

Accordingly, as shown at 810, the UE may take action to not transmit the recommended bit rate query (e.g., by dropping the transmission). In some cases, taking action to not transmit the recommended bit rate query may include deciding not to generate the recommended bit rate query. In some cases, the UE may take action to not transmit the recommended bit rate query if the prohibit timer has not expired.

Further, as illustrated, the determination of whether to transmit the recommended bit rate query to the base station at 806 may also be based on at least one of a handover indication received from the base station or a change mode request received from the base station, as illustrated by 807 and described above with respect to FIG. 7.

According to aspects, while FIGS. 7 and 8 illustrate separate decision flows related to determining whether to transmit the query message based on detecting the one or more channel quality metrics have improved or degraded, respectively, it should be understood that these decision flows may be combined by the UE when making the determination of whether to transmit the query message (e.g., when determining to delay or not transmit the query message). For example, with respect to steps 706 and 806 of FIGS. 7 and 8, respectively, the UE may jointly detect that the measured one or more channel quality metrics have not degraded relative to one or more previous channel quality metrics by a first threshold amount and have not improved relative to the one or more previous channel quality metrics by a second threshold amount.

In this case, determining whether to transmit the query message to the base station comprises determining to not transmit the query message to the base station based, at least in part, on the detecting that the measured one or more channel quality metrics have not degraded by the first threshold amount and have not improved by the second threshold amount. Accordingly, in this case, taking the one or more actions comprises dropping or delaying transmission of the query message.

According to aspects, if the UE detects that the measured one or more channel quality metrics have degraded by the first threshold amount or the measured one or more channel quality metrics have improved by the second threshold amount, the UE may determine to transmit the query message to the base station, as described above in steps 708 and 808 of FIGS. 7 and 8, respectively.

Figure 9:
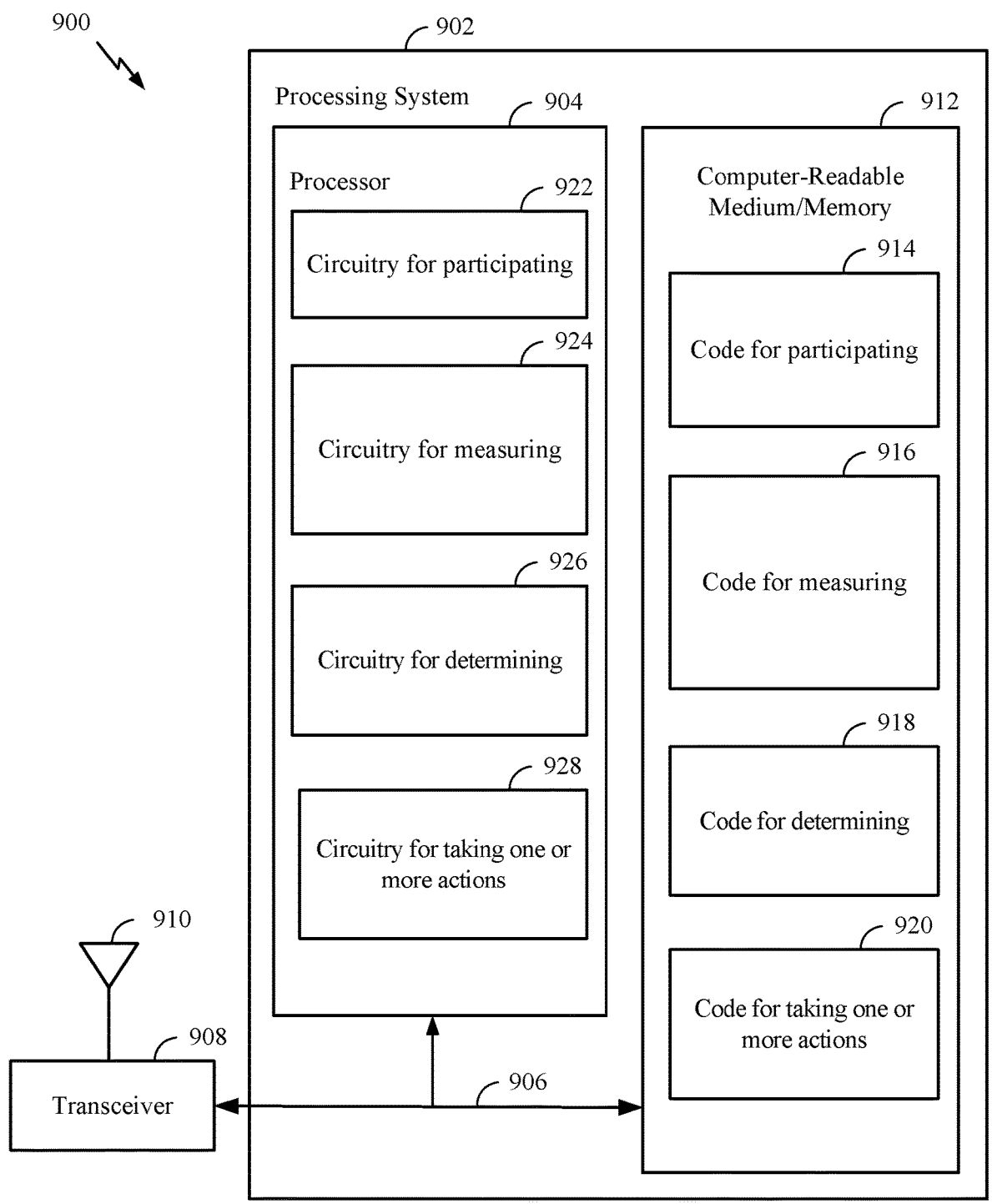
FIG. 9 illustrates a communications device that may include various components configured to perform operations for the techniques disclosed herein in accordance with aspects of the present disclosure.

FIG. 9 illustrates a wireless node 900 that may include various components (e.g., corresponding to means-plus-function components) configured to perform operations for the techniques disclosed herein, such as the operations illustrated in one or more of FIG. 3 or 5-8. The wireless node 900 includes a processing system 902 coupled to a transceiver 908. The transceiver 908 is configured to transmit and receive signals for the wireless node 900 via an antenna 910, such as the various signals as described herein. The processing system 902 may be configured to perform processing functions for the wireless node 900, including processing signals received and/or to be transmitted by the wireless node 900. In some cases, the wireless node may comprise a UE (e.g., UE 120).

The processing system 902 includes a processor 904 coupled to a computer-readable medium/memory 912 via a bus 906. In certain aspects, the computer-readable medium/ memory 912 is configured to store instructions (e.g., computer-executable code) that when executed by the processor 904, cause the processor 904 to perform the operations illustrated in one or more of FIG. 3 or 5-8, or other operations for transmitting a recommended bit rate query. In certain aspects, computer-readable medium/memory 912 stores code 914 for participating in a voice call with a base station using a channel and a bit rate for the voice call; code 916 for measuring one or more channel quality metrics for the channel during the voice call; code 918 for determining whether to transmit a query message to the base station to request a change in the bit rate based, at least in part, on the measured one or more channel quality metrics, at least one of a handover indication received from the base station or a change mode request received from the base station, and a prohibit timer; and code 920 for taking one or more actions based on the determination.

In certain aspects, the processor 904 includes circuitry configured to implement the code stored in the computer-readable medium/memory 912, such as for performing the operation illustrated in one or more of FIG. 3 or 5-8 as well as other operations described herein for transmitting a recommended bit rate query. For example, the processor 904 includes circuitry 922 for participating in a voice call with a base station using a channel and a bit rate for the voice call; circuitry 924 for measuring one or more channel quality metrics for the channel during the voice call; circuitry 926 for determining whether to transmit a query message to the base station to request a change in the bit rate based, at least in part, on the measured one or more channel quality metrics, at least one of a handover indication received from the base station or a change mode request received from the base station, and a prohibit timer; and circuitry 928 for taking one or more actions based on the determination.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/ device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3 and 5-8 and other operations for performing the various techniques discussed herein for transmitting a recommended bit rate query.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communication, comprising:
participating in a voice call with a base station using a channel and a bit rate for the voice call;
measuring one or more channel quality metrics for the channel during the voice call;
detecting that the measured one or more channel quality metrics have improved relative to one or more previous channel quality metrics by a threshold amount and the bit rate is less than a maximum bit rate for the voice call;
determining whether to transmit a query message to the base station to request a change in the bit rate based, at least in part, on the measured one or more channel quality metrics, at least one of a handover indication received from the base station or a change mode request received from the base station, and a prohibit timer,
wherein the determining comprises determining to transmit the query message to the base station based, at least in part, on the detecting that the measured one or more channel quality metrics have improved by the threshold amount; and
taking one or more actions based on the determination.

2. The method of claim 1, wherein determining to transmit the query message to the base station is further based on detecting that the bit rate is less than the maximum bit rate for the voice call.

3. The method of claim 2, wherein:
taking the one or more actions comprises transmitting the query message to the base station to request the change in the bit rate based on the determination to transmit the query message to the base station; and
the query message comprises a request to increase the bit rate for the voice call based on the detection that measured one or more channel quality metrics have improved.

4. The method of claim 1, wherein:
the prohibit timer indicates a time after expiration of which the query message may be transmitted; and
the one or more channel quality metrics include one or more of a block error rate (BLER), signal to noise ratio (SNR), reference signal received quality (RSRQ).

5. A method for wireless communication, comprising:
participating in a voice call with a base station using a channel and a bit rate for the voice call;
measuring one or more channel quality metrics for the channel during the voice call;
detecting the measured one or more channel quality metrics have degraded relative to one or more previous channel quality metrics by a threshold amount and the bit rate is greater than a minimum bit rate for the voice call;
determining whether to transmit a query message to the base station to request a change in the bit rate based, at least in part, on the measured one or more channel quality metrics, at least one of a handover indication received from the base station or a change mode request received from the base station, and a prohibit timer; and
taking one or more actions based on the determination.

6. The method of claim 5, wherein determining whether to transmit the query message to the base station comprises determining to transmit the query message to the base station based, at least in part, on the detecting that the measured one or more channel quality metrics have degraded by the threshold amount.

7. The method of claim 6, wherein determining to transmit the query message to the base station is further based on detecting that the bit rate is greater than the minimum bit rate for the voice call.

8. The method of claim 7, wherein:
taking the one or more actions comprises transmitting the query message to the base station to request the change in the bit rate based on the determination to transmit the query message to the base station; and
the query message comprises a request to decrease the bit rate for the voice call based on the detection that measured one or more channel quality metrics have degraded.

9. A method for wireless communication, comprising:
participating in a voice call with a base station using a channel and a bit rate for the voice call;
measuring one or more channel quality metrics for the channel during the voice call;
detecting that the measured one or more channel quality metrics have not degraded relative to one or more previous channel quality metrics by a first threshold amount and have not improved relative to the one or more previous channel quality metrics by a second threshold amount;
determining whether to transmit a query message to the base station to request a change in the bit rate based, at least in part, on the measured one or more channel quality metrics, at least one of a handover indication received from the base station or a change mode request received from the base station, and a prohibit timer; and
taking one or more actions based on the determination.

10. The method of claim 9, wherein:
determining whether to transmit the query message to the base station comprises determining to not transmit the query message to the base station based, at least in part, on the detecting that the measured one or more channel quality metrics have not degraded by the first threshold amount and have not improved by the second threshold amount; and
taking the one or more actions comprises dropping transmission of the query message.

11. An apparatus for wireless communication, comprising:
at least one processor configured to:
participate in a voice call with a base station using a channel and a bit rate for the voice call;
measure one or more channel quality metrics for the channel during the voice call;
detect that the measured one or more channel quality metrics have improved relative to one or more previous channel quality metrics by a threshold amount and the bit rate is less than a maximum bit rate for the voice call;
determine whether to transmit a query message to the base station to request a change in the bit rate based, at least in part, on the measured one or more channel quality metrics, at least one of a handover indication received from the base station or a change mode request received from the base station, and a prohibit timer,
wherein the at least one processor is configured to determine whether to transmit the query message to the base station by determining to transmit the query message to the base station based, at least in part, on:
the detecting that the measured one or more channel quality metrics have improved by the threshold amount; and
the detecting that the bit rate is less than the maximum bit rate for the voice call; and
take one or more actions based on the determination, wherein the at least one processor is configured to take the one or more actions by transmitting the query message to the base station to request the change in the bit rate based on the determination to transmit the query message to the base station and the query message comprises a request to increase the bit rate for the voice call based on the detection that measured one or more channel quality metrics have improved by the threshold amount; and
a memory coupled with the at least one processor.

12. The apparatus of claim 11, wherein:
the prohibit timer indicates a time after expiration of which the query message may be transmitted; and
the one or more channel quality metrics include one or more of a block error rate (BLER), signal to noise ratio (SNR), reference signal received quality (RSRQ).

13. An apparatus for wireless communication, comprising:
at least one processor configured to:
participate in a voice call with a base station using a channel and a bit rate for the voice call;
measure one or more channel quality metrics for the channel during the voice call;
detect that the measured one or more channel quality metrics have degraded relative to one or more previous channel quality metrics by a threshold amount and the bit rate is greater than a minimum bit rate for the voice call:
determine whether to transmit a query message to the base station to request a change in the bit rate based, at least in part, on the measured one or more channel quality metrics, at least one of a handover indication received from the base station or a change mode request received from the base station, and a prohibit timer; and
take one or more actions based on the determination; and
a memory coupled with the at least one processor.

14. The apparatus of claim 13, wherein:
the at least one processor is configured to determine whether to transmit the query message to the base station by determining to transmit the query message to the base station based, at least in part, on:
the detecting that the measured one or more channel quality metrics have degraded by the threshold amount; and
the detecting that the bit rate is greater than the minimum bit rate for the voice call;
the at least one processor is configured to take one or more actions by transmitting the query message to the base station to request the change in the bit rate based on the determination to transmit the query message to the base station; and
the query message comprises a request to decrease the bit rate for the voice call based on the detection that measured one or more channel quality metrics have degraded by the threshold amount.

15. An apparatus for wireless communication, comprising:
at least one processor configured to:
participate in a voice call with a base station using a channel and a bit rate for the voice call;
measure one or more channel quality metrics for the channel during the voice call;
detect that the measured one or more channel quality metrics have not degraded relative to one or more previous channel quality metrics by a first threshold amount and have not improved relative to the one or more previous channel quality metrics by a second threshold amount;
determine whether to transmit a query message to the base station to request a change in the bit rate based, at least in part, on the measured one or more channel quality metrics, at least one of a handover indication received from the base station or a change mode request received from the base station, and a prohibit timer, wherein the at least one processor is configured to determine whether to transmit the query message to the base station by determining to not transmit the query message to the base station based, at least in part, on the detecting that the measured one or more channel quality metrics have not degraded by the first threshold amount and have not improved by the second threshold amount; and
take one or more actions based on the determination, wherein the at least one processor is configured to take the one or more actions by dropping transmission of the query message; and
a memory coupled with the at least one processor.

16. A non-transitory computer-readable medium for wireless communications, comprising:
instructions that, when executed by at least one processor, cause the at least one processor to:
participate in a voice call with a base station using a channel and a bit rate for the voice call;
measure one or more channel quality metrics for the channel during the voice call;
detect that the measured one or more channel quality metrics have improved relative to one or more previous channel quality metrics by a threshold amount and the bit rate is less than a maximum bit rate for the voice call;
determine whether to transmit a query message to the base station to request a change in the bit rate based, at least in part, on the measured one or more channel quality metrics, at least one of a handover indication received from the base station or a change mode request received from the base station, and a prohibit timer, wherein the instructions to determine wither to transmit the query message cause the at least one processor to determine to transmit the query message to the base station based, at least in part, on the detecting that the measured one or more channel quality metrics have improved by the threshold amount; and
take one or more actions based on the determination.

* * * * *